Figure 1:
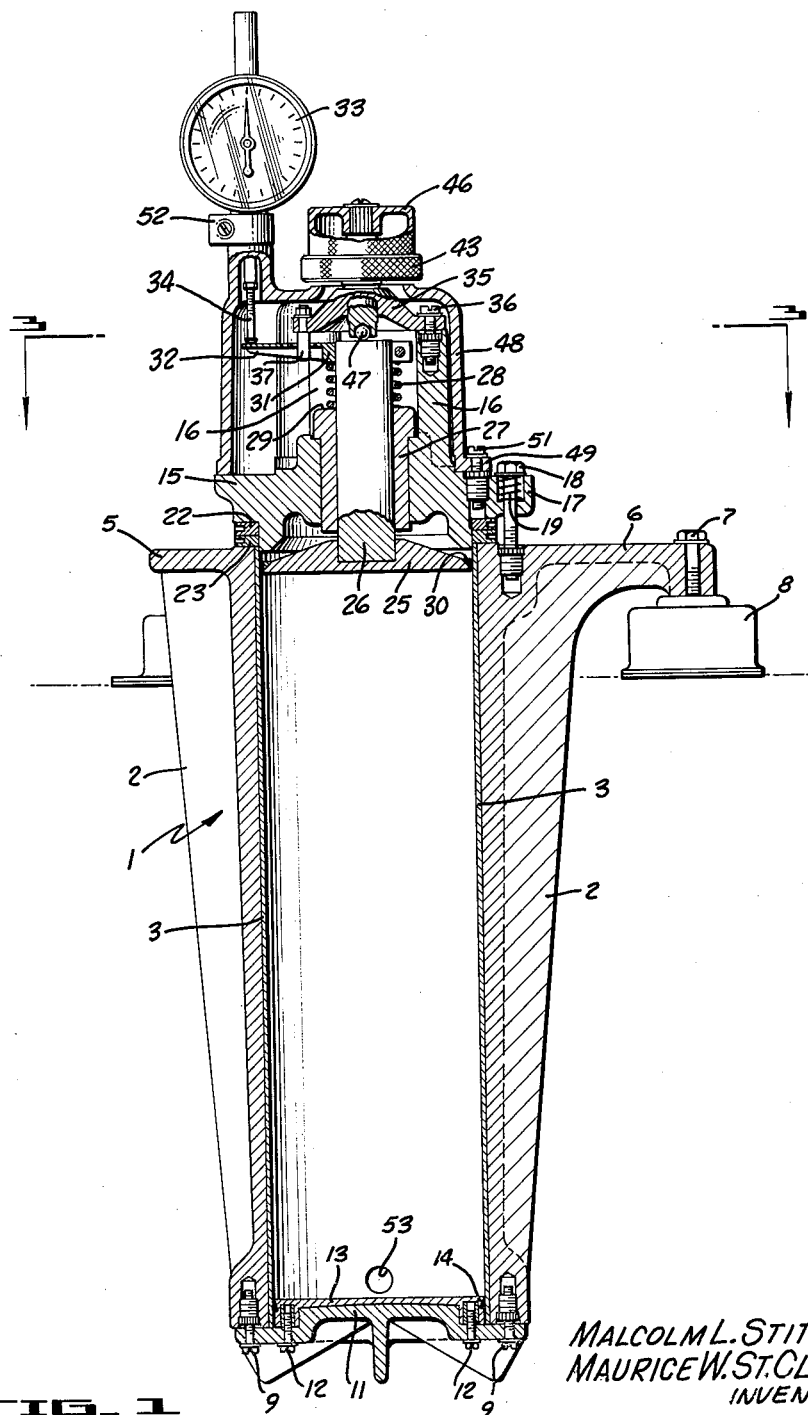

April 17, 1962 M. L. STITCH ET AL 3,030,594
HIGH FREQUENCY TUNABLE CAVITY APPARATUS
Filed Jan. 6, 1955 3 Sheets-Sheet 1

MALCOLM L. STITCH &
MAURICE W. ST. CLAIR
INVENTORS

BY Paul B. Hunter
ATTORNEY

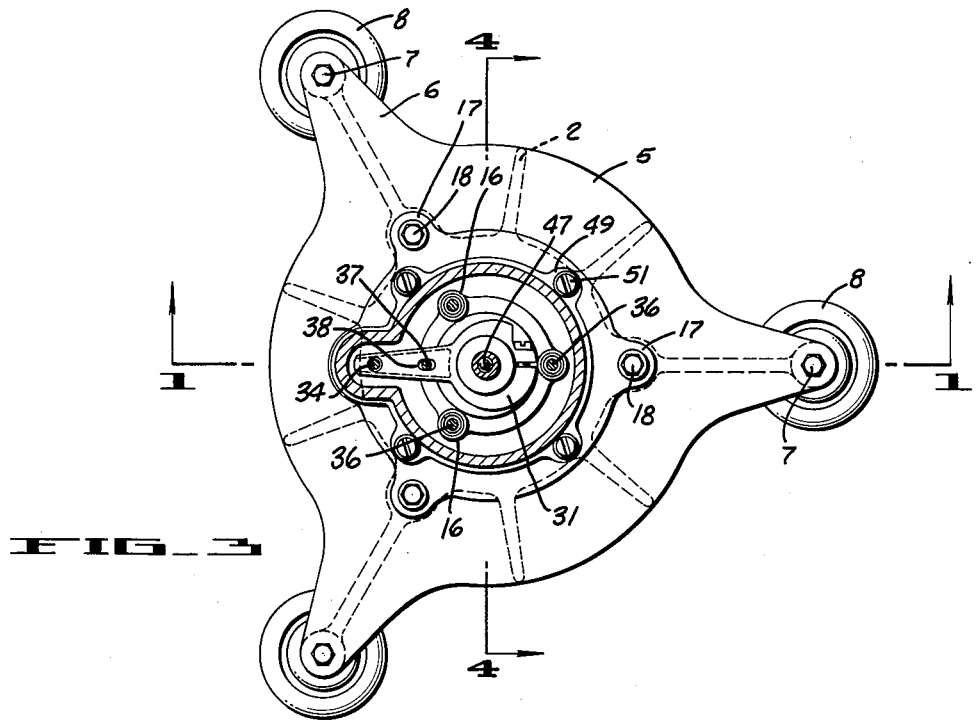
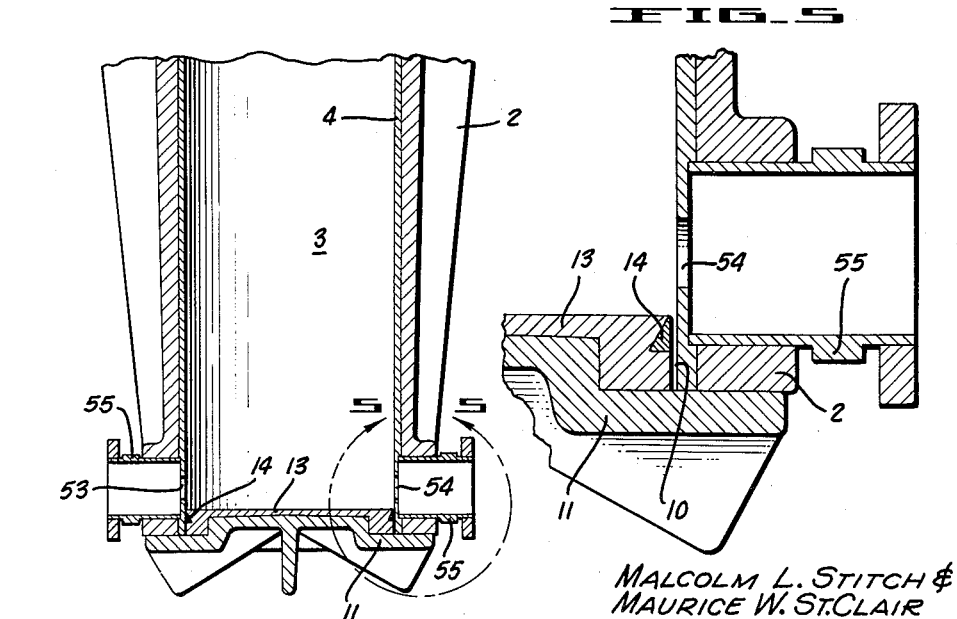

United States Patent Office 3,030,594
Patented Apr. 17, 1962

3,030,594
HIGH FREQUENCY TUNABLE CAVITY APPARATUS
Malcolm L. Stitch, Palo Alto, and Maurice W. St. Clair, San Mateo, Calif., assignors to Varian Associates, San Carlos, Calif., a corporation of California
Filed Jan. 6, 1955, Ser. No. 480,207
7 Claims. (Cl. 333—83)

This invention relates in general to high frequency resonant tunable apparatus and more particularly to a novel high frequency tunable cavity of the external variety suitable for use in stabilizing the operating frequency of oscillators, as a reference cavity, as a wave meter, etc.

Stabilization of high frequency oscillators has been accomplished in a variety of ways, one of the most satisfactory of which employs an external high Q cavity. The external cavity is especially useful for stabilization in a system exposed to high frequency perturbations. Stabilizing external cavities have heretofore been constructed which will decrease the frequency deviation as compared to the deviation of an unstabilized system by a factor of several hundred. However, this result has been accomplished only with an accompanying increase in the size and weight of the cavity. Prior to the present invention an external cavity which would provide a stability factor of several hundred required a cavity several feet in height which weighed over 100 pounds. Due to its size and weight such a cavity is unsatisfactory in many applications, its use being prohibited in airborne equipment for example.

The object of the present invention is to provide a relatively light weight, compact, tunable external stabilizing apparatus which will maintain frequency stability in an environment of physical shock and vibration.

One feature of this invention is the provision of a novel light weight apparatus of the above character having a compact cavity housing which will provide sufficient strength and rigidity to prevent torsional and longitudinal responses (microphonics) to mechanical shock and vibration.

Another feature of the invention is the provision of an apparatus of the above character having a novel adjusting mechanism utilizing one or more tapered rings such that by rotation of a ring or rings the tuning piston in the cavity resonator may be properly aligned within the cavity.

Another feature of this invention is the provision of a convenient, rapid and novel apparatus for tuning the resonant cavity to a desired frequency.

Another feature of this invention is the provision of a novel tuner locking mechanism which prevents inadvertent detuning.

Still another feature of this invention is the provision of a novel arrangement of lossy elements for trapping and suppressing undesirable electromagnetic waves.

Still another feature of the invention is the provision of a novel method of supporting the cavity such that a minimum of external shock and vibration is transmitted to the resonant cavity.

Figure 2:
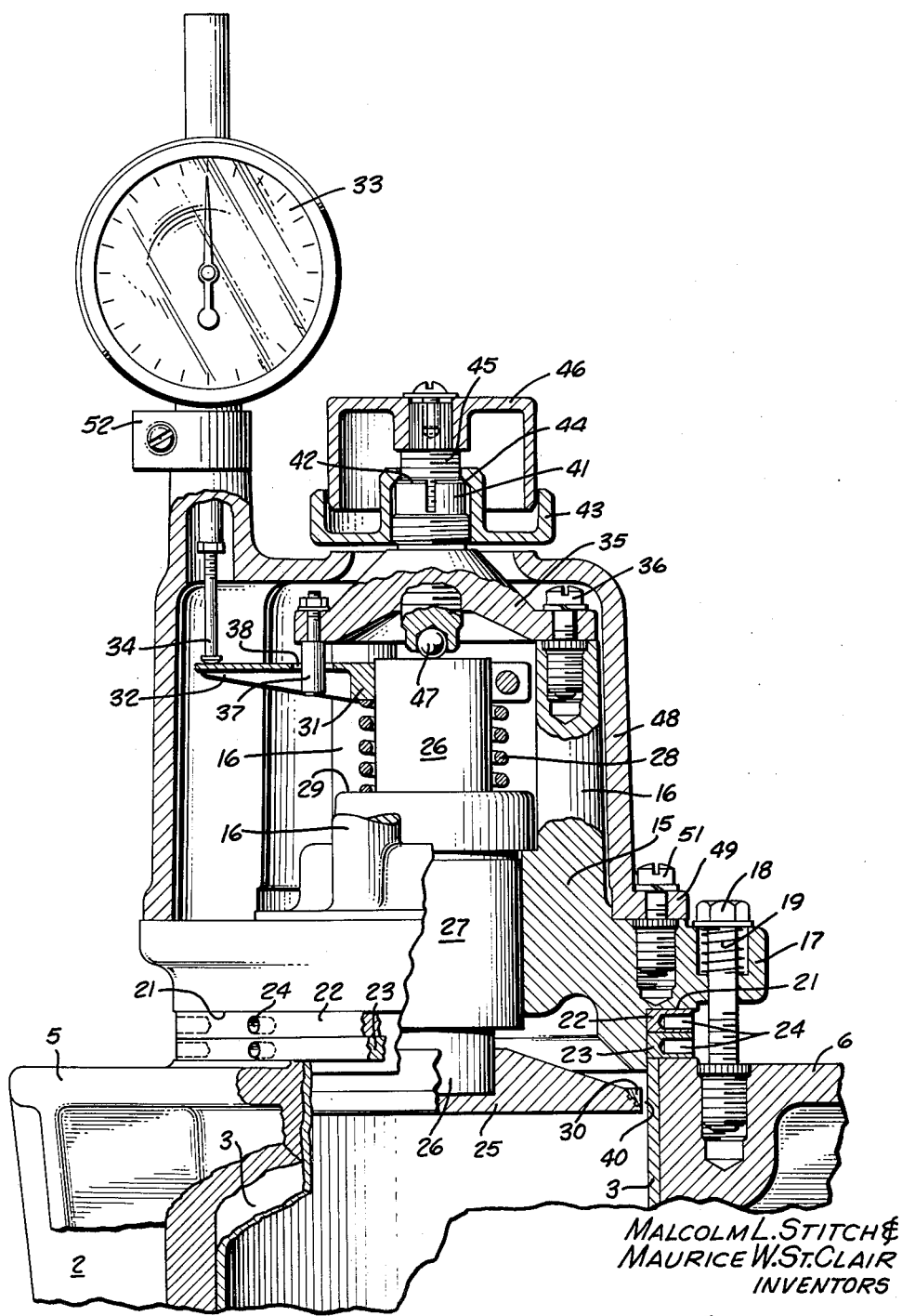

Other features and advantages of this invention will become apparent from a perusal of the specification taken in connection with the accompanying drawings wherein:

FIG. 1 is a longitudinal section view illustrating an external cavity resonator assembly constructed in accordance with the principles of the present invention, the section being taken through the device along section line 1—1 in FIG. 3, FIG. 2 is an enlarged fragmentary side elevation view partly in section of the assembly shown in FIG. 1 which shows in greater detail the alignment rings, tuning structure and the mode trapping and suppressing element, FIG. 3 is a top view of the stabilizing cavity resonator in section through line 3—3 of FIG. 1 showing tuner and support elements, FIG. 4 is an enlarged fragmentary cross-sectional view through line 4—4 of FIG. 3 showing the end plate and waveguide elements of this device, and FIG. 5 is a fragmentary view of a portion of the apparatus shown in FIG. 4 showing in greater detail the end plate interior dimensions.

The construction of the novel cavity resonator device will now be described, followed by a description of the function and operation of the device. Referring now to the drawings, there is depicted a hollow bell-shaped housing 1 including the strengthening ribs 2 and flanged end portion 5 having protruding support arms 6. The housing is constructed of a strong, light weight material such as, for example, magnesium. A thin, hollow, cylindrical-shaped member 3 of a good electrical conductor material such as copper is secured within the housing 1, the member defining the walls of the cavity resonator. The arms 6 are fitted with suitable holes therein to receive holddown screws 7 which anchor in shock resistant mounts 8.

Secured to the cavity housing 1 by cap screws 9 and closing the lower end of the cavity resonant chamber is a ribbed circular end plate 11 which has affixed to its interior face by cap screws 12 a circular electrical conducing wall 13. The conducting wall 13 is smaller in diameter at its interior face than the inside diameter of the cavity resonator member 3 and thus at its face does not make electrical contact with the wall member 3 thereby creating a lesser annular spacing or cavity 10. Around the circumference of the end wall 13 is a V-shaped recess into which is embedded a lossy substance 14 such as, for example, a mixture of astrolite and powdered iron. For a more detailed drawing of the end wall structure see FIGS. 4, 5.

An annular tuner mount 15 forms the base for and is an integral part of three upstanding support legs 16. Tuner mount 15 is provided with three horizontal protrusions 17 which are suitably bored to received holddown cap screws 18 and springs 19. An annular horizontal face 21 of the tuner mount rides upon the upper one of two adjusting rings 22 and 23 which are both tapered in thickness such that a side elevation silhouette of each ring would form a right angle trapezoid. These rings are provided with holes 24 at convenient intervals around their perimeters to facilitate rotation of the rings by insertion of a pin or wrench with prongs arranged to engage the holes. The tapered rings are made of a wear resistant material such as steel. The function of these rings will be subsequently explained.

Forming the uppermost wall of the cavity resonator is a tuning piston 25 rigidly secured on piston rod 26 and operating through sleeve 27 which is press fitted into the cylindrical aperture in the tuner mount 15. The piston is made of a good electrical conductor such as copper. The piston rod and sleeve are constructed of a hard, wear resistant material such as steel. A lossy material is located in the space between piston 25 and turner mount 15 and is shown held in position on the afterside of tuning piston 25 by two annular anchor recesses (see FIG. 2). This lossy material may be made of a mixture of powdered iron and astrolite 30. The outside diameter of piston 25 is less than the inside diameter of the resonator chamber thereby creating an annular spacing 40 and a lesser associated cavity coupled thereto. Tuning piston 25 is urged upwardly against the ball bearing 47 in the lower end of the tuning rod 45 by compression spring 28 which rides upon the sleeve shoulder 29 and the lower face of indicator actuator clamp 31 secured to the rod 26.

Indicator actuator clamp 31 is annular in shape with a horizontal protruding arm 32, the outermost end of which actuates the frequency indicator 33 by impelling the feeler rod assembly 34.

Mounted on the three tuner mount support legs 16 is an inverted funnel-shaped pedestal 35 provided with a flange thereon at its wide end, said flange having four holes suitably bored therein. Three of these holes receive holddown cap screws 36. Securely affixed in the fourth hole is a guidepost assembly 37 which extends downwardly through an aperture 38 in the tuner actuator arm 32. The upstanding hollow stem of the funnel-shaped pedestal 35 is threaded both on its interior and exterior walls. The topmost extremity of the stem is cross slotted along its longitudinal axis thereby forming a plurality of fingers 41. The uppermost extremity of these fingers have a beveled shoulder 42 and are threadbare both inside and out for a short distance down the stem. Threaded to mate with the external threads of the upstanding stem is a locking ring 43 with an interior beveled shoulder 44. Threaded through the stem portion of the funnel-shaped pedestal 35 is a tuning rod 45 provided with a knob 46 at its uppermost extremity and having affixed to its lower end a ball bearing 47, the ball bearing engaging the upper end surface of the piston rod 26.

Surrounding and covering the tuning structure is a housing element 48 having horizontal flange protrusions 49 by which the housing is secured to the tuner mount with holddown screws 51. A clamp assembly 52 secures the indicator 33 to the housing 48.

At the lower extremity of the resonator chamber 3 and physically diametrically opposed are two irises, one 53 for the input of electromagnetic energy, the other 54 for the output of electromagnetic energy. Waveguides 55 with flange assemblies are mounted in the cavity housing structure.

In operation, microwave energy enters the resonant cavity through iris 53. The resonant frequency of the cavity will depend upon the chamber dimensions. Thus by varying the position of the tuner piston 25 a desired resonant frequency can be selected. Longitudinal positioning of the tuner piston 25 is obtained by rotation of tuner knob 46 causing tuner actuating rod 45 to travel down through tuner pedestal 35 overpowering spring 28 and impelling piston rod 26 downward. Reverse rotation of tuner knob 46 allows spring 28 to return the tuner piston 25 to its uppermost limit of travel determined by the position of actuator rod 45.

Locking of the tuner actuating rod 45 in the selected position is obtained by rotating locking ring 43 which travels down the pedestal stem 41 and causes locking ring shoulder 44 to ride against the beveled fingers 42 forcing said fingers inward in a tightly clasping manner against the tuner actuator rod 45.

Oftentimes in assembly of the cavity the axis of rotation of the tuning piston will not be in true parallelism with the cavity chamber. In such event it becomes necessary to slightly tilt the tuner foundation to obtain parallelism. For this purpose the two tapered rings 22, 23 are provided. Relative rotation of the two rings will tilt the tuner mount to the slight degree necessary to align the tuner piston 25.

The position of the tuner piston 25 within the cavity chamber is indicated on the dial of indicator 33. Piston positions are transmitted to said dial by the horizontal arm 32 of actuating clamp 31 which rides against the lower extremity of feeler rod 34.

Since dimensions of the resonant chamber are all important in determining the resonant frequency, it is imperative that any changing of dimensions due to compression waves in the cavity structure be kept to an absolute minimum to reduce microphonics. Thus, to prevent vibration and shock waves from being transmitted to the cavity from its environment, the cavity is mounted on shock resistant mounts 8 which are located in a horizontal plane substantially coincident with the cavity's center of mass. Furthermore, to prevent microphonics produced by relative motion of the cavity structure itself, the housing has been reinforced with ribbed structural elements 2.

Under operating conditions of a resonant cavity many different electromagnetic modes may exist within the cavity. It would be most desirable to eliminate all modes except the desired mode at which the resonator is designed to operate. These existing modes are of two varieties, transverse magnetic and transverse electric. Since these two types of modes induce currents in the chamber walls at right angles to each other, it is possible to eliminate one variety by introducing infinite resistance in its circuit. This is accomplished in the present cavity by providing spacings between the end conducting surfaces (piston 25 and end wall 13) and the cylindrical walls. The previously referred to spacings while eliminating undesirable modes, also create a possible loss of power by permitting standing waves to be set up in the spacings and/or in the lesser spaces coupled to the spacing. To prevent the formation of these undesirable standing waves, lossy elements 14 and 30 are inserted to reduce the Q of these lesser spaces below that amount necessary to sustain standing waves.

For convenience in the present invention the output and input irises are physically opposite each other. However, it is not necessary that they be so arranged. The important factor concerning location of the input and output irises is the distance from the end wall 13 to the center line of the iris. For maximum coupling to the desired mode of oscillation, the distance from the end wall to the center line of the iris is determined by the formula $$d = \frac{L}{2n}$$

were $n$ is the number of the desired $T.E._{1,m,n}$ mode and $L$ is the length of the resonant chamber.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a high frequency apparatus, a substantially hollow open ended member defining the side walls of a cavity resonator, a movable tuning piston within the cavity resonator and extending outwardly therefrom said piston being slightly spaced at its peripheral edge from the resonator walls thereby creating lesser spaces, a tuner mount surrounding the outer portion of said piston and covering one end of the cavity resonator, a stationary end wall closing the other end of the cavity resonator said stationary end wall at its interior conducting face being slightly spaced from the side walls thereby creating lesser associated spaces, lossy elements disposed adjacent the lesser spaces associated with the main cavity thereby preventing the acting up of standing faves within these spaces, frequency indicating means coupled to the piston, screw means for actuating the piston coupled to the piston, a pedestal member carried by the tuner mount and having a tubular portion through which screw means pass in actuating the piston, a locking ring positioned concentric to said screw means and operating upon the tubular portion of the pedestal member thereby forcing segments of said tubular member against the actuating rod, a tapered ring disposed between the cavity resonator and the tuner mount such that rotation of said ring will effect alignment of the tuning piston within the cavity resonator, a longitudinally ribbed cavity housing with protruding arms, and a shock resistant means supporting said arms.

2. In a high frequency apparatus, a substantially hollow open ended member defining the side walls of a cavity resonator, an end covering member secured over an open end of the cavity resonator and having an aperture therein, a tuning piston slideable within the aperture in said end covering member and movable within said hollow member for determining the resonant frequency of the cavity resonator, said tuning piston deriving its alignment within the cavity resonator via the longitudinal axis of the aperture in said end covering member, means for actuating said tuning piston, a tapered ring positioned between said hollow open ended member and said end covering member, said end covering member deriving support with respect to said hollow open ended member by bearing upon said tapered ring, and said ring being angularly adjustable to tilt said end covering member with respect to said hollow open ended member whereby said piston is aligned within the cavity resonator.

3. In a high frequency apparatus, an open ended tubular member forming the side walls of a cavity resonator, a tuner mount covering an open end of said tubular member and having an opening therein, the side walls of the opening defining a bearing surface, a movable tuning piston within the cavity resonator and having an extension extending outwardly thereof through the opening in said tuner mount, said tuning piston deriving its alignment within the resonator via the bearing surface formed by the aperture in said tuner mount, and a tapered ring positioned between and forming a bearing surface common to said tuner mount and said open ended tubular member whereby relative angular rotation of said tapered ring with respect to said tuner mount and said open ended tubular member will tilt the tuner mount with respect to said open ended tubular member thereby affecting alignment of the tuning piston within the cavity resonator.

4. In a high frequency cavity resonator apparatus, a substantially hollow open ended member defining the side walls of the cavity resonator, an end covering member secured over an open end of said open ended member and having an aperture therein, a tuning piston slidable within the aperture in said end covering member and movable within the cavity resonator for tuning the resonant frequency thereof, said tuning piston deriving its transverse alignment within the cavity resonator via the longitudinal axis of the aperture in said end covering member, means for actuating said tuning piston longitudinally of the cavity resonator, a plurality of tapered rings positioned between said hollow open ended member and said end covering member, said end covering member deriving support with respect to said hollow open ended member by bearing upon one of said tapered rings and said tapered rings being angularly adjustable to tilt said end covering member with respect to said hollow open ended member whereby said tuning piston is aligned within the cavity resonator.

5. In an apparatus as claimed in claim 4 including spring means for holding said tapered rings, said hollow open ended member, and said end covering member in relatively light bearing engagement with each other whereby angular rotation of said tapered rings is facilitated while assuring that a positive change in the alignment of said tuning piston is achieved.

6. A high frequency high Q stabilizing cavity resonator apparatus including, a substantially hollow open ended member defining the walls of the cavity resonator, a cavity housing enveloping said hollow open ended member, a plurality of ribbed strengthening members running longitudinally of and spaced about the circumference of said housing to thereby strengthen said cavity housing and to render the cavity resonator substantially nonresponsive to mechanical shock and vibration, and an end covering member secured over an open end of said hollow member and having an aperture therein, a tuning piston slideable within the aperture in said end covering member and movable within said hollow member for defining the resonant frequency of the cavity resonator, means for actuating said piston within the cavity resonator, and supporting arms fixedly coupled to said cavity housing, said supporting arms lying in a plane passing in close proximity to the center of gravity of the cavity resonator apparatus whereby detrimental effects of mechanical shock and vibration are substantially reduced.

7. Apparatus as claimed in claim 6 including shock resistant mounts supporting the cavity resonator apparatus via the intermediary of said supporting arms.

References Cited in the file of this patent

UNITED STATES PATENTS

| | | |
|---|---|---|
| 1,246,947 | Schott | Nov. 20, 1917 |
| 2,460,090 | Kannenberg | Jan. 25, 1949 |
| 2,500,535 | Froom | Mar. 14, 1950 |
| 2,530,248 | Larson | Nov. 14, 1950 |
| 2,543,697 | Lanter | Feb. 27, 1951 |
| 2,549,906 | Johansson | Apr. 24, 1951 |
| 2,593,234 | Wilson | Apr. 15, 1952 |
| 2,600,186 | Banos | June 10, 1952 |
| 2,605,459 | Cook | July 29, 1952 |
| 2,607,509 | Hess | Aug. 19, 1952 |
| 2,645,857 | Andersson | July 21, 1953 |
| 2,647,753 | Goldmark | Aug. 4, 1953 |
| 2,825,843 | Haegele | Mar. 4, 1958 |

FOREIGN PATENTS

| | | |
|---|---|---|
| 936,708 | France | Feb. 23, 1948 |

UNITED STATES PATENT OFFICE
CERTIFICATE OF CORRECTION

Patent No. 3,030,594                           April 17, 1962

Malcolm L. Stitch et al.

It is hereby certified that error appears in the above numbered patent requiring correction and that the said Letters Patent should read as corrected below.

Column 4, line 63, for "acting up of standing faves" read -- setting up of standing waves --.

Signed and sealed this 4th day of September 1962.

(SEAL)
Attest:

ERNEST W. SWIDER                           DAVID L. LADD
Attesting Officer                            Commissioner of Patents